3,819,698
BIS-SELENOSEMICARBAZIDES
John Colin Brown and Patrick Joseph Keogh, Ilford, England, assignors to Ilford Limited, Ilford, England
No Drawing. Filed Dec. 17, 1971, Ser. No. 209,340
Claims priority, application Great Britain, Dec. 22, 1970, 60,802/70
Int. Cl. C07c *103/30*
U.S. Cl. 260—558 H           4 Claims

ABSTRACT OF THE DISCLOSURE

New bis-selenosemicarbazides of the formula $$\begin{array}{c} R_1 \\ \diagdown \\ R_2 \diagup \end{array} N - \overset{Se}{\underset{\|}{C}} - \overset{R_3}{\underset{|}{N}} - \overset{R_4}{\underset{|}{N}} - \overset{O}{\underset{\|}{C}} - X - \overset{O}{\underset{\|}{C}} - \overset{R_5}{\underset{|}{N}} - \overset{R_6}{\underset{|}{N}} - \overset{Se}{\underset{\|}{C}} - N \begin{array}{c} \diagup R_7 \\ \diagdown R_8 \end{array}$$

wherein each of $R_1$–$R_8$ is a hydrogen atom or an alkyl, aralkyl or aryl group there being up to four substituent groups in the molecule of which all four may be alkyl groups but only two of which may be aryl or aralkyl groups, at least one of $R_1$, $R_2$, $R_3$, $R_6$, $R_7$ and $R_8$ being a hydrogen atom and X is a direct link or a divalent linking group selected from the group $-(CH_2)_n-Y-(CH_2)_m-$ where $n$ and $m$ are each 0–5 and Y is $-(CH_2)-$, an oxygen atom or a sulphur atom or a group $-NR_9-$ where $R_9$ is a hydrogen atom or an alkyl, aryl or aralkyl group or from a phenylene or naphthalene nucleus are described.

This invention relates to novel bis-selenosemicarbazides and to their production.

According to the present invention there is provided a bis-selenosemicarbazide of the general formula $$\begin{array}{c} R_1 \\ \diagdown \\ R_2 \diagup \end{array} N - \overset{Se}{\underset{\|}{C}} - \overset{R_3}{\underset{|}{N}} - \overset{R_4}{\underset{|}{N}} - \overset{O}{\underset{\|}{C}} - X - \overset{O}{\underset{\|}{C}} - \overset{R_5}{\underset{|}{N}} - \overset{R_6}{\underset{|}{N}} - \overset{Se}{\underset{\|}{C}} - N \begin{array}{c} \diagup R_7 \\ \diagdown R_8 \end{array} \quad (I)$$

wherein each of $R_1$–$R_8$ is a hydrogen atom or an alkyl, aralkyl or aryl group there being up to four substituent groups in the molecule of which all four may be alkyl groups but only two of which may be aryl or aralkyl groups, at least one of $R_1$, $R_2$, $R_3$, $R_6$, $R_7$ and $R_8$ being a hydrogen atom and X is a direct link or a divalent linking group selected from the group $$—(CH_2)_n—Y—(CH_2)_m—$$

where $n$ and $m$ are each 0–5 and Y is $—CH_2—$, an oxygen atom or a sulphur atom or a group $—NR_9—$ where $R_9$ is a hydrogen atom or an alkyl, aryl or aralkyl group or from a phenylene or naphthalene nucleus.

Bis-selenosemicarbazides of formula (I) wherein each of $R_1$–$R_8$ is a hydrogen atom or six or seven of $R_1$–$R_8$ are hydrogen atoms the remainder being alkyl groups containing from 1 to 4 carbon atoms, X is a direct link, a phenylene nucleus or a group $—(CH_2)_n—Y—(CH_2)_m—$ where Y is $—CH_2—$ or $—S—$ and $m$ and $n$ are each 0–2 are also provided.

Symmetrical bis-selenosemicarbazides of formula I are prepared by reacting two moles of a selenosemicarbazide of the general formula $$\begin{array}{c} R_1 \\ \diagdown \\ R_2 \diagup \end{array} N - \overset{Se}{\underset{\|}{C}} - \overset{R_3}{\underset{|}{N}} - \overset{R_4}{\underset{|}{N}} - NH \quad \text{or} \quad \begin{array}{c} R_7 \\ \diagdown \\ R_8 \diagup \end{array} N - \overset{Se}{\underset{\|}{C}} - \overset{R_5}{\underset{|}{N}} - \overset{R_6}{\underset{|}{N}} - NH$$
$$\text{(IIa)} \hspace{4cm} \text{(IIb)}$$

wherein each of $R_1$–$R_8$ is a hydrogen atom or an alkyl, aralkyl or aryl group there being up to two substituent groups in the molecule of which each may be an alkyl group but only one of which may be an aryl or aralkyl group, with a dibasic acid chloride of the general formula ClCO—X—COCl wherein X has the meaning given above.

Unsymmetrical bis-selenosemicarbazides of formula (I) are prepared by reacting a mole of a selenosemicarbazide of formula (IIa) or (IIb) with an acid chloride-half ester, preferably an acid chloride-half ester, of a dibasic acid of the general formula ClCO—X—COOR$_{10}$ wherein X has the meaning given above and $R_{10}$ is an alkyl or aralkyl group, hydrolyzing the ester to form the free acid, and converting the acid to the acid chloride and reacting the latter with a mole of a selenosemicarbazide of formula (IIb) or (IIa) respectively, provided that in total there are not more than four substituent groups of which all four may be alkyl groups but not more than two may be aryl or aralkyl groups and at least one of $R_1$, $R_2$ and $R_3$ or $R_6$, $R_7$ and $R_8$ respectively in one of the selenosemicarbazide moieties is a hydrogen atom.

Unsymmetrical bis-selenosemicarbazides of formula (I) may also be prepared by reacting a selenosemicarbazide of formula (IIa) or (IIb) with an excess of a dibasic acid chloride and then reacting the unreacted acid chloride group with a selenosemicarbazide of formula (IIb) or (IIa) respectively.

The following dibasic acid chlorides are of use in the preparation of the bis-selenocarbazides of formula (I):

$$\begin{array}{c} COCl \\ | \\ COCl \end{array}$$

$$\begin{array}{c} CH_2COCl \\ | \\ COCl \end{array}$$

$$\begin{array}{c} CH_2-COCl \\ | \\ CH_2-COCl \end{array}$$

$$(CH_2)_4 \begin{array}{c} \diagup COCl \\ \diagdown COCl \end{array}$$

$$\begin{array}{c} CH_2-COCl \\ | \\ S \\ | \\ CH_2-COCl \end{array}$$

$$\begin{array}{c} COCl \\ | \\ \phantom{x} \\ \text{(p-phenylene)} \\ | \\ COCl \end{array}$$

The selenosemicarbazides of the above formulae (IIa) and (IIb) are known compounds as shown by the references set forth below.

The following formula (III) indicates the nitrogen atom referred to in the references.

$$\overset{(1)}{NH_2} - \overset{(2)}{NH} - \overset{Se}{\underset{\|}{C}} - \overset{(4)}{NH_2} \quad (III)$$

4-phenylselenosemicarbazide—preparation described by Jensen & Frederiksen, Z. anorg. allgem. Chem. *230*, 31–3 (1936).
2-phenylselenosemicarbazide—preparation described by Mautner & Kumler, J. Amer. Chem. Soc., 97–101 (1956).
4 - ethylselenosemicarbazide—preparation described by Huls & Renson, Bull.soc.chem.Belges, *65*, 684–95 (1956).
4-propylselenosemicarbazide—preparation described by Colland-Charon, Huls & Renson, Bull.soc.chim.Belges, *71*, 541–53 (1962).
1-phenylselenosemicarbazide and
1-(p-tolyl) selenosemicarbazide-preparations described by Coland-Charon, Huls & Renson, Bull.soc.chim.Belges, *71*, 554–62 (1962).

1-methylselenosemicarbazide,
2-methylselenosemicarbazide,
4-methylselenosemicarbazide,
1,1-dimethylselenosemicarbazide,
1,2-dimethylselenosemicarbazide,
1,4-dimethylselenosemicarbazide and
1,2,4 - trimethylselenosemicarbazide — preparations described by Jensen, Felbert, Pedersen & Svanhol, *Acta chem Scand* 20(1), 278–81 (1966).
2-methyl-4-phenylselenosemicarbazide,
4-(p-chlorphenyl) selenosemicarbazide and
4-(p-methoxyphenyl) selenosemicarbazide—preparations described by Bulka, Ahlens & Tucek, *Chem. Ber.*, 100(4), 1373–8 (1967).

The bis-selenosemicarbazides of the present invention are of use as bleach-fix accelerators as described in our co-pending U.S. application Ser. No. 100,839 and when at least three of $R_1$–$R_4$ and at least three of $R_5$–$R_8$ are hydrogen atoms these compounds are of use as intermediates in the synthesis of bis-triazoleselenols as described in our co-pending application Ser. No. 209,339 (corresponding to British Application No. 60,801/70) filed on even date herewith.

EXAMPLE 1

Preparation of oxalyl-1,1'-bis(selenosemicarbazide)

Oxalyl chloride (3.0 g.) was added with stirring to a slurry of selenosemicarbazide (6.4 g.) in dry distilled pyridine (50 ml.). After vigorous reaction, the resulting dark red brown solution was stirred at room temperature for a further 3½ hours. Water (50 ml.) was then added, and mixture was evaporated *in vacuo* to give a black oily residue, which was dissolved in 10% by weight sodium hydroxide solution (20 ml.), and filtered. Acidification of the filtrate with glacial acetic acid (20 ml.) gave oxalyl-1,1'-bis(selenosemicarbazide) as an orange solid (1.2 g.), M.P. 193° C. (decomp.).

EXAMPLE 2

Preparation of terephthaloyl-1,1'-bis(selenosemicarbazide)

When proceeding according to Example 1 but using therephthaloyl chloride (4.1 g.) and selenosemicarbazide (5.5 g.) and heating the mixture to dissolve the acid chloride 4.0 g. of therephthaloyl - 1,1' - bis(selenosemicarbazide) m.p. 197–203° C. (decomp.) were obtained.

In the Example which follows a colour negative film was used which was made up as follows:

| Layer Order and Sensitivity: | Silver Coating Weight in mg. of Ag/decimetre² |
|---|---|
| Non Stress | — |
| Blue Sensitive | 13.4 |
| Colloidal Silver Filled Layer | — |
| Green Sensitive Topcoat | 13.1 |
| Intralayer | — |
| Green Sensitive Subcoat | 16.0 |
| Interlayer | — |
| Red Sensitive Topcoat | 17.5 |
| Red Sensitive Subcoat | 13.6 |
| Base of cellulose triacetate | — |
| Total | 73.6 |

In this film: the blue sensitive layer contained a yellow colour coupler of the formula:

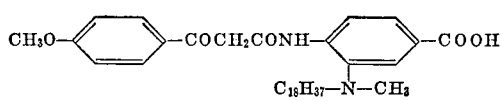

the green sensitive layers each contained a magenta colour coupler of the formula:

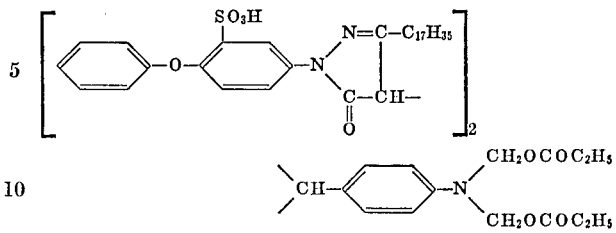

the red sensitive layers each contained a cyan colour coupler of the formula:

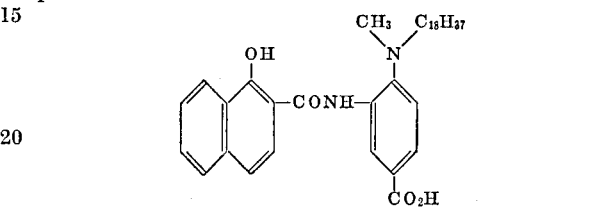

The following processing solutions were used in Example 3.

Colour Developer

| | G. |
|---|---|
| Sodium metaborate | 80 |
| Sodium sulphite anhydrous | 2.0 |
| Potassium bromide | 1.0 |
| Hydroxylamine sulphate | 2.6 |
| 4-amino-N-ethyl - N - (β-hydroxy ethyl)aniline sulphate | 4.6 |
| Water to 1 litre. | |

Stop-Fix

| | | |
|---|---|---|
| Sodium thiosulphate pentahydrate | g | 171 |
| Sodium acetate anhydrous | g | 31.4 |
| Sodium sulphite anhydrous | g | 4.3 |
| Acetic acid glacial | ml | 35 |
| Potassium alum | g | 17.0 |
| Ammonium chloride | g | 43 |
| Water to 1 litre. | | |

Bleach-Fix

| | | |
|---|---|---|
| Disodium tetraborate decahydrate | g | 12.5 |
| Boric acid | g | 22.5 |
| Sodium hydroxide | g | 10.0 |
| Ethylenediamine tetraacetic acid | g | 16.2 |
| Disodium salt of ethylenediamine tetraacetic acid | g | 3.5 |
| Ferric chloride (60% w./w. solution) | ml | 15.0 |
| Sodium thiosulphate pentahydrate | g | 95 |
| Sodium sulphite anhydrous | g | 4.0 |
| Water to 1 litre. | | |

Conditioner

| | | |
|---|---|---|
| Disodium salt of ethylenediamine tetraacetic acid | g | 0.50 |
| Sodium carbonate anhydrous | g | 4.5 |
| Formaldehyde (40% w./v. solution) | ml | 10 |
| Wetting agent (8% w./v. solution) | ml | 1.7 |
| Water to 1 litre. | | |

All processing solutions and wash water were used at 24° C.

Pieces of the colour negative film were fogged and processed in a number of processing sequences all containing the use of a bleach-fix bath. The metallic silver remaining in the film at the end of each processing sequence was measured by analysis and expressed in mg. of Ag/decimetre².

When the bleach-fix bath or stop-fix bath contained one of the specified bleach-fix accelerators a reduction in the amount of residual silver resulted. The residual silver resulting when one of the accelerators was used is expressed as a percentage of that obtained when no accelerator was used (referred to as the control).

EXAMPLE 3

Pieces of the colour negative film were processed as follows:

Colour developer: 10 minutes
Stop-fix: 4 minutes with and without accelerator
Bleach-fix: 6 minutes
Wash: 4 minutes
Conditioner: 4 minutes
Wash: 4 minutes
Dry.

The silver content of the pieces of film was analysed with the following results:

TABLE 1

| Accelerator Example number | Concentration of accelerator in the stop-fix bath in mg./litre | Residual silver | |
|---|---|---|---|
| | | Mg./dm.³ | Percent of control |
| 1 | 300 | 1.0 | 8.4 |
| No accelerator | | 11.96 | 100 |

What we claim is:
1. A bis-selenosemicarbazide of the formula

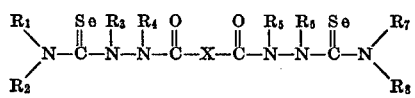

wherein each of $R_1$–$R_8$ is hydrogen, alkyl having 1–4 carbon atoms, phenyl, chlorophenyl, methoxyphenyl or tolyl, there being up to four such substituent groups other than hydrogen atoms in the molecule of which all four may be alkyl but only two may be phenyl, chlorophenyl, methoxyphenyl or tolyl, at least one of $R_1$, $R_2$, $R_3$, $R_6$, $R_7$ and $R_8$ is hydrogen and X is a direct link, phenylene, naphthylene, or —$(CH_2)_n$—Y—$(CH_2)_m$— where $n$ and $m$ are each zero or an integer of 1–5 and Y is —NH—, —$CH_2$—, oxygen or sulfur.

2. A bis-selenosemicarbazide as defined in claim 1 wherein each of $R_1$–$R_8$ is hydrogen or six or seven of $R_1$–$R_8$ are hydrogen, the remainder being alkyl containing 1–4 carbon atoms, X is a direct link, phenylene or —$(CH_2)_n$—Y—$(CH_2)_m$— where Y is —$CH_2$— or —S— and $m$ and $n$ are each 1–2.

3. A bis-selenosemicarbazide according to claim 1, which is oxalyl-1,1'-bis(selenosemicarbazide).

4. A bis-selenosemicarbazide according to claim 1, which is terephthaloyl-1,1'-bis(selenosemicarbazide).

References Cited
UNITED STATES PATENTS
3,607,918   9/1971   Jurewicz _____ 260—558

HARRY I. MOATZ, Primary Examiner

U.S. Cl. X.R.

260—561 H, 553 R; 96—66.3